United States Patent [19]

Oshiage et al.

[11] Patent Number: 4,739,469
[45] Date of Patent: Apr. 19, 1988

[54] FAIL-SAFE CIRCUIT FOR A CONTROL SYSTEM

[75] Inventors: Katsunori Oshiage; Akito Yamamoto; Toshimi Abo, all of Yokohama, Japan

[73] Assignee: Nissan Motor Company, Limited, Yokohama, Japan

[21] Appl. No.: 724,596

[22] Filed: Apr. 18, 1985

[30] Foreign Application Priority Data

Apr. 19, 1984 [JP] Japan ................................ 59-77542
Apr. 19, 1984 [JP] Japan ................................ 59-77544

[51] Int. Cl.$^4$ ............................................ G06F 11/00
[52] U.S. Cl. ............................. 364/187; 364/431.11; 371/9
[58] Field of Search ............ 364/184, 187, 431.04, 364/431.11; 371/7-9, 11, 61-62; 123/417, 479

[56] References Cited

U.S. PATENT DOCUMENTS

| | | | |
|---|---|---|---|
| 4,386,427 | 5/1983 | Hosaka | 371/11 |
| 4,532,594 | 7/1985 | Hosaka et al. | 364/431.11 |
| 4,541,050 | 9/1985 | Honda et al. | 371/62 X |
| 4,580,220 | 4/1986 | Braun et al. | 364/431.11 |
| 4,583,176 | 4/1986 | Yamato et al. | 364/431.11 |
| 4,584,645 | 4/1986 | Kosak | 364/431.11 |
| 4,587,655 | 5/1986 | Hirao et al. | 364/431.11 X |
| 4,594,667 | 6/1986 | Yasuhara | 364/431.04 X |
| 4,621,322 | 11/1986 | Suzuki et al. | 364/200 |

FOREIGN PATENT DOCUMENTS

| | | |
|---|---|---|
| 0042653 | 12/1981 | European Pat. Off. . |
| 0041701 | 12/1981 | European Pat. Off. . |
| 48-3351 | 1/1973 | Japan . |
| 53-54441 | 5/1978 | Japan . |
| 57-155601 | 9/1982 | Japan . |
| 2000327 | 1/1979 | United Kingdom . |
| 2045968 | 11/1980 | United Kingdom . |

Primary Examiner—Gary V. Harkcom
Attorney, Agent, or Firm—Schwartz, Jeffery, Schwaab, Mack, Blumenthal & Evans

[57] ABSTRACT

A highly reliable, fail-safe circuit for a control system wherein a controlled device will always receive a control signal derived from a main control circuit when the main control circuit operates normally even if a back-up control circuit backing up at least one function of the main control circuit which is a minimum requirement for an operation of the controlled device fails or wherein a controlled device will receive a control signal derived from the back-up control circuit when the main control circuit fails. Replacement of the control signal from the main control circuit with a back-up control signal from the back-up circuit is carried out only when the back-up circuit outputs a particular signal at or near a predetermined frequency or alternatively when the back-up circuit outputs a plurality of parallel logical signals in a predetermined combination.

16 Claims, 8 Drawing Sheets

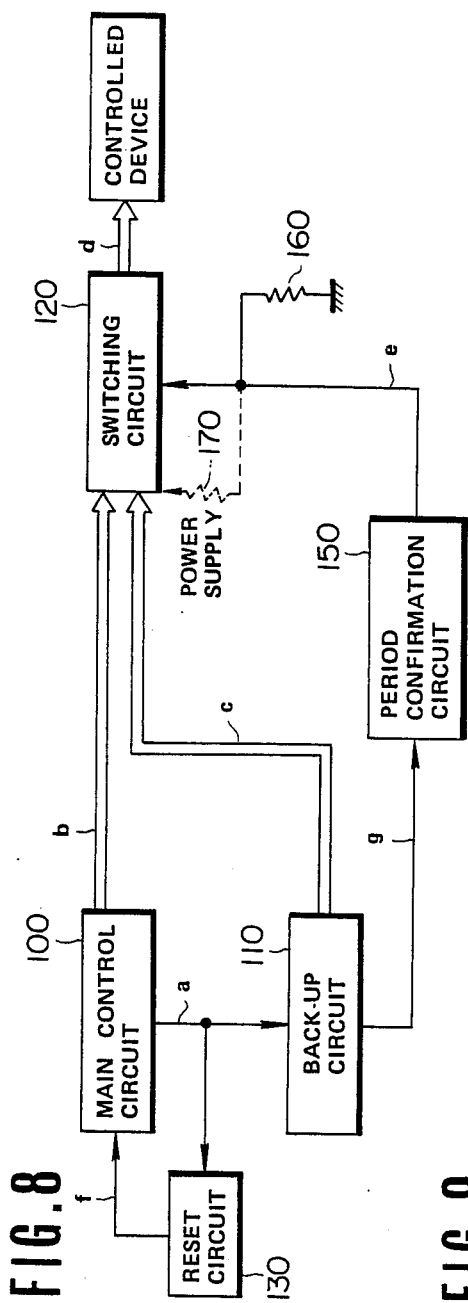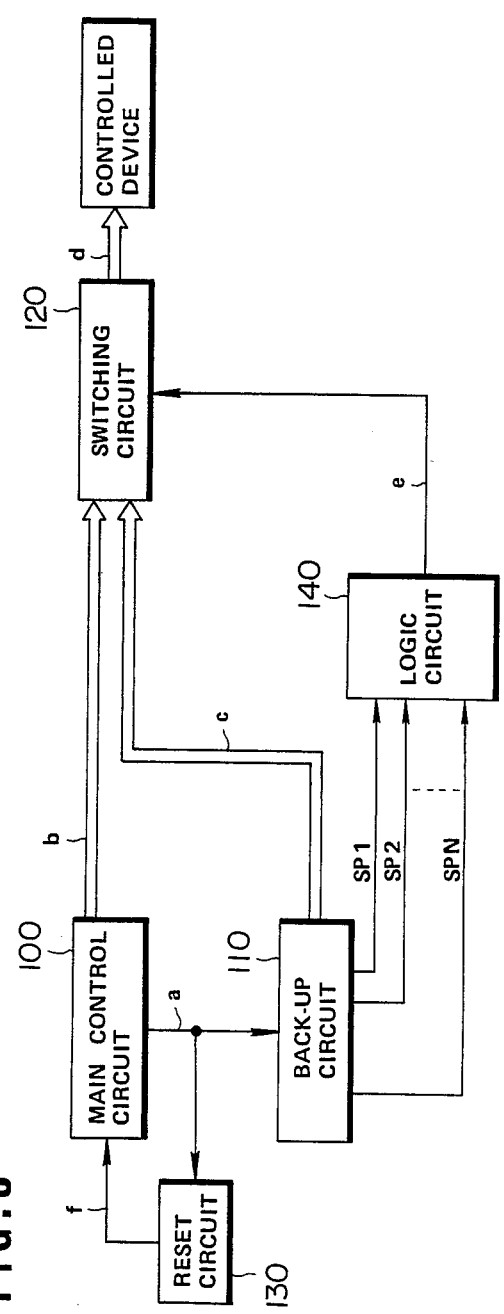

FAIL-SAFE CIRCUIT FOR A CONTROL SYSTEM

BACKGROUND OF THE INVENTION

1. Field of the Invention

The present invention relates to a fail-safe circuit for a control system, and particularly relates to the fail-safe circuit for the control system which reliably backs up a main control circuit of the system by taking over control operations when the main control circuit fails.

2. Description of the Prior Art

Conventional fail-safe circuits are exemplified by Japanese Patent Applications Unexamined Open No. Sho. 48-3351 and No. Sho. 53-54441.

FIG. 1 shows an example of such a conventional fail-safe circuit for a control system. In FIG. 1, a main control circuit 1 includes a microcomputer and outputs a control signal b' to a switching circuit 20 and a status signal a' indicative of the status of the main control circuit 1 to a back-up circuit 10. The status signal a' has a predetermined frequency realized by periodically inverting an output port by means of the main control circuit 1 in accordance with a program. Hence, if the main control circuit fails, the status signal a' will remain in one state for an excessively long time.

The above-described back-up circuit 10 constitutes an auxiliary control circuit and serves as a fail-safe circuit which detects failure of the main control circuit 1 reflected in the status signal a' and produces a signal c' as a substitute for the control signal b' as well as a switching signal e'. The switching signal e' is sent to the switching circuit 20 which outputs a control signal d' to a controlled device, the control signal d' being selected from either the control signal b' or back-up signal c' depending on the status of the switching signal e'. Furthermore, a reset circuit 30 produces a reset signal f for resetting the main control circuit 1 when the status signal a' described above indicates failure of the main control circuit.

However, there is a drawback in the system described above in that since a single switching signal e' from the back-up circuit 10 enables switching between the control signal b' from the main control circuit 1 and back-up signal c' from the back-up circuit 10 to select as the control output d', the back-up circuit 10 may produce a faulty switching signal e' in spite of the normal operatin of the main control circuit 1, leading to the danger of an erroneous or abnormal back-up signal c' being used as the control output d'.

In this way, the back-up circuit which is intended to function merely as a fail-safe circuit for the main control circuit may disturb the control output due to its own failure. This degrades significantly the reliability of the whole control system.

SUMMARY OF THE INVENTION

With the above-described drawback in mind, it is an object of the present invention to provide a fail-safe circuit for a control system which has a significantly lower change of erroneous operation. The above-described object can be achieved by providing a fail-safe circuit for a control system comprising: (a) first means for providing a first control signal for a controlled device, (b) second means for providing a second control signal for the controlled device, (c) third means for recognizing malfunction of the first means, (d) fourth means responsive to recognition of malfunction of the first means by the third means for outputting a unique signal, (e) fifth means for selectably transmitting one of the first and second control signals as a control output to the controlled device, and (g) sixth means responsive to the unique signal for outputting a third control signal to the fifth means causing the fifth means to output the second control signal to the controlled object.

BRIEF DESCRIPTION OF THE DRAWINGS

A more complete understanding of the present invention may be obtained from the following description taken in conjunction with the attached drawings, in which like reference numerals designate corresponding elements and in which:

FIG. 8 is a simplified block circuit diagram of a second preferred embodiment of the fail-safe circuit according to the present invention;

FIG. 9 is a simplified block circuit diagram of a third preferred embodiment of the fail-safe circuit according to the present invention;

DETAILED DESCRIPTION OF THE PREFERRED EMBODIMENTS

Reference will hereinafter be made to the drawings in order to facilitate understanding of the present invention.

Figure 1:
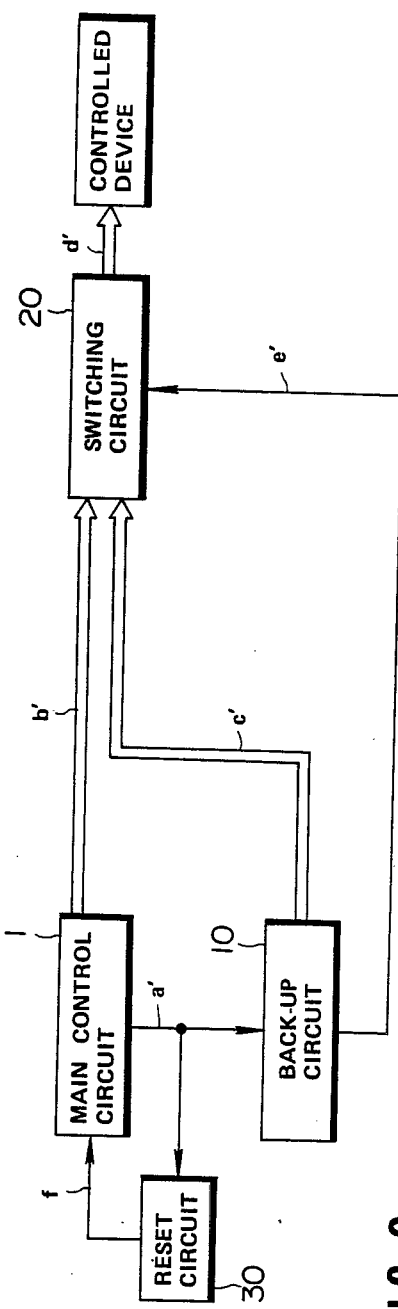
FIG. 1 is a simplified block circuit diagram of a conventional fail-safe circuit for a control system.
Figure 2:
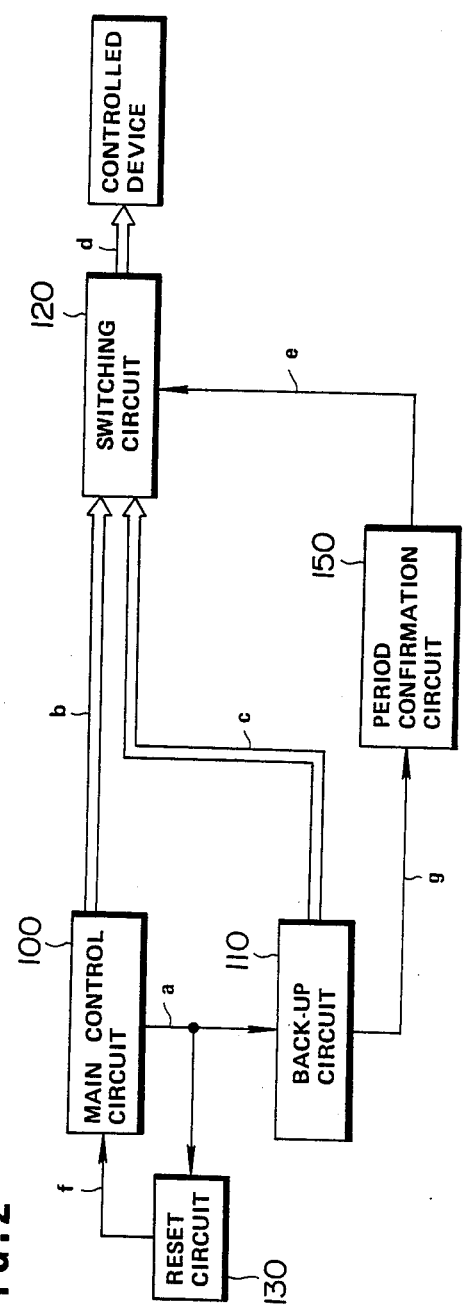
FIG. 2 is a simplified block circuit diagram of a first preferred embodiment of the fail-safe circuit according to the present invention.

FIG. 2 shows a first preferred embodiment according to the present invention.

In FIG. 2, the main control circuit 100 includes a microcomputer acting as a processing unit which outputs the control signal b. The microcomputer comprises a Central Processing Unit (CPU), an Input/Output Unit, Read-Only Memory (ROM), and Random-Access Memory (RAM). The main control circuit 100 outputs the status signal a to the back-up circuit 110. The status signal a has a predetermined frequency realized by periodically inverting an output port in accordance with a program incorporated in the main control circuit 100. The process of generating the status signal a will be described in greater detail later. When the main control circuit 100 malfunctions, the status signal a will remain at one level for an excessively long time. It is noted that one level described above means no appearance of the status signal, excessively low or high frequency thereof.

The back-up circuit 110 constitutes an auxiliary control circuit acting as the fail-safe circuit which recognizes failure in the main control circuit on the basis of the status signal a, in which case it produces the back-up signal c and a rectangular-pulse signal g having a predetermined frequency. The switching circuit 120 switches between the control signal b and back-up signal c depending upon the status of the switching signal e and outputs one of them as the control output d to the controlled device.

The reset circuit 130 responds to abnormalities in the main control unit 100 indicated by the status signal a by resetting the main control circuit 100.

A period confirmatin circuit 150 is connected between the back-up circuit 110 and the switching circuit 120 for outputting the switching signal e to the switching circuit 120 only when the period of the rectangular wave pulse signal g is equal to or approximates a predetermined period.

Figure 3A:
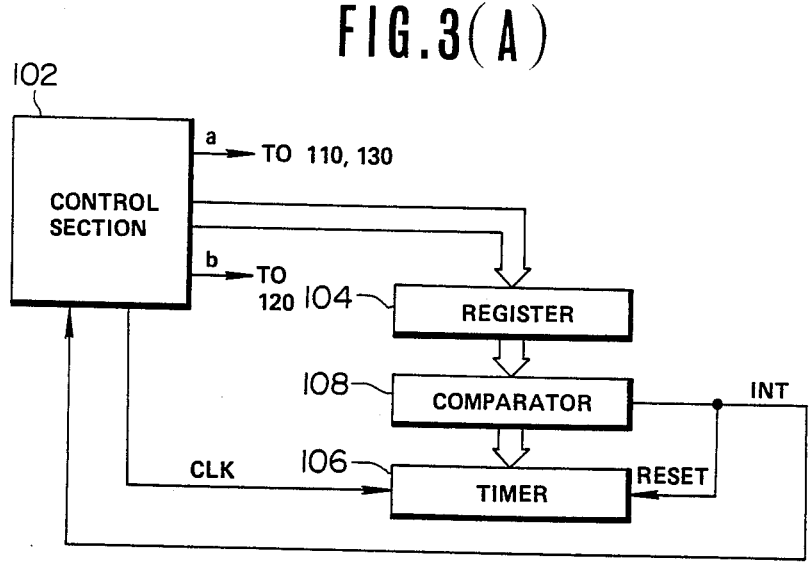
FIG. 3(A) is a simplified block circuit diagram of a main control circuit shown in FIG. 2.
Figure 3B:
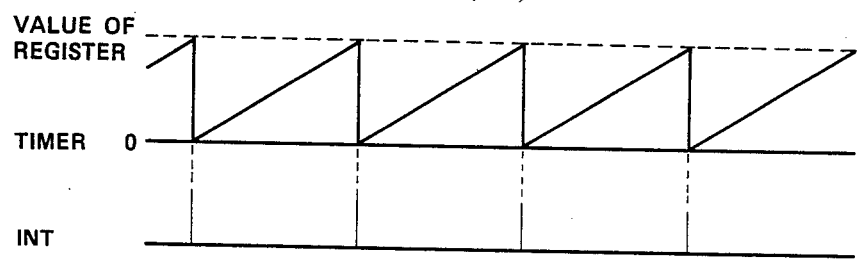
FIG. 3(B) is a timing chart for the circuit shown in FIG. 3(A).

FIG. 3(A) shows an example of the general structure of the main control circuit 100. In FIG. 3(A), numeral 102 denotes a control section including a Central Processing Unit (CPU) for controlling various elements and functions of the main control circuit 100, a Read-Only Memory (ROM) which stores a control program for the controlled device with the program being shown in FIG. 4, a Random-Access Memory (RAM) for temporarily storing data etc., and an Input/Output Unit for receiving and sending various kinds of signals from and to other external circuits including the circuits shown in FIG. 2. During control processing for the controlled device, the control section 102 sets a predetermined value in a register 104. In addition, a timer 106 counts clock pulses CLK from the control section 102 in order to measure a constant interval of time and a comparator 108 compares the number of clock pulses CLK couner by the timer 106 with the set value of the register 104 and generates an interrupt signal INT when the clock pulse count in the timer 106 matches the value set in the register 104, as shown in FIG. 3(B). The interrupt signal INT is sent to the control section 102 and used as a reset signal to reset the timer 106 and as an interrupt signal as explained below.

Figure 4:
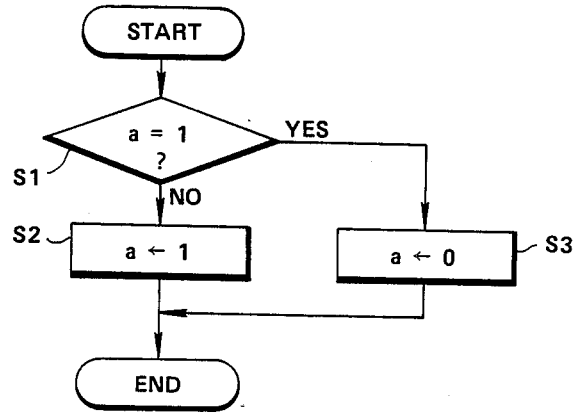
FIG. 4 is a processing flowchart for the process of generating the status signal in the main control circuit shown in FIG. 2.

FIG. 4 illustrates a program for generating the status signal. The status signal generating program of the control section is activated in response to receipt of the interrupt signal INT.

In a step S1 of FIG. 4, the control section 102 determines whether the signal a is at its higher level. Thereafter, the program ends after inverting the signal level in a step S2 or S3.

Figure 5A:
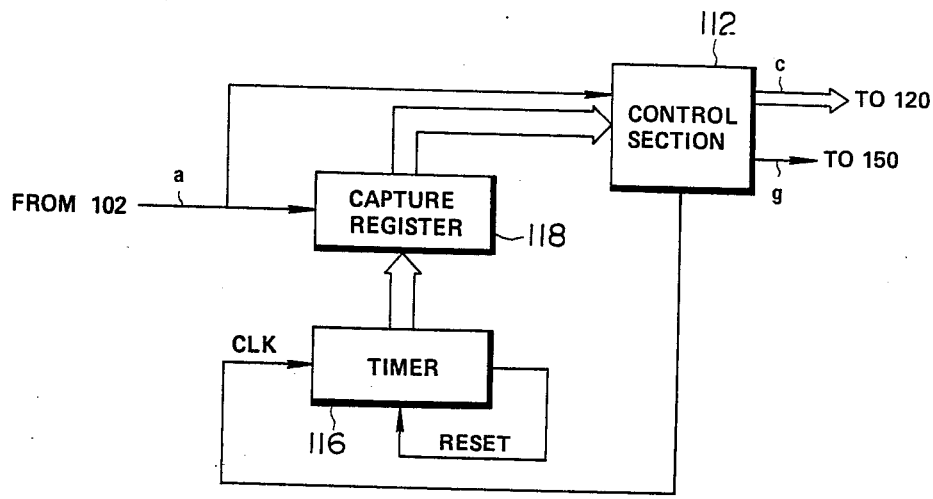
FIG. 5(A) is a simplified block circuit diagram of the main part of the back-up circuit shown in FIG. 2.
Figure 5B:
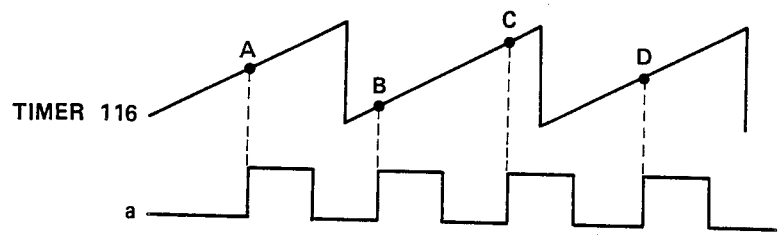
FIG. 5(B) is a timing chart for the circuit shown in FIG. 5(A)

FIG. 5(A) shows an example of the general structure of the back-up circuit 110 in this embodiment explaining how the period of the status signal a is confirmed. In FIG. 5(A), another control section 112 is provided in the back-up circuit 110, which functions similarly to that in the main control circuit 100. In addition, another timer 116 is provided for counting the clocks pulses CLK to measure the constant period of time. Furthermore, a capture register 118 is provided for sampling the number counted by the timer 118 when the signal a rises. The control section 112 can measure the period of the signal a by noting the values of the timer 116. That is to say, if the values of A, B, C, D are recorded in response to successive rising edges of signal a as shown in FIG. 5(B), the period of the signal a can be obtained by calculating B-A, C-B, D-C, ...

Figure 6:
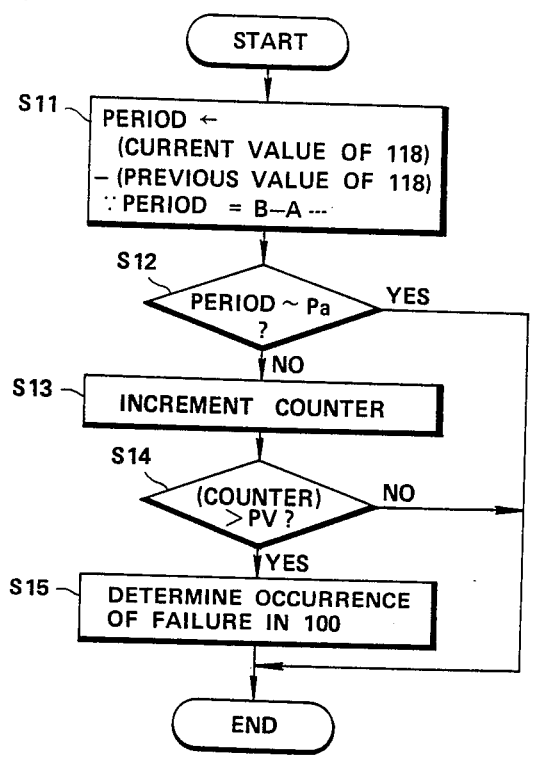
FIG. 6 is a processing flowchart for a failure recognition process executed by the back-up circuit.

FIG. 6 shows a program for controlling the switching circuit 120 carried out by the control section 112. The control procedure is activated by the rising edge of the signal a. First, in a step S11, the period of the signal a is calculated and thereafter in a step S12 the control section 112 determines whether the period is equal to or close to that in the case of normal operation (Pa). If so, the program ends. If not, the routine goes to the step S13 in which the control section 112 increments a counter which monitors how long the measured period has been erroneous. The counters described above can be realized by the using part of the memory. In the next step S14, the control section 112 determines whether the value of the counter described above exceeds a predetermined value PV. If so ((counter)>PV), the routine goes to a step S15; otherwise ((Counter)≦PV), the program ends. In the step S15, a flag kept in a memory area of the control section 112 is set to indicate that the main control circuit 100 is malfunctioning. Thereafter, the program ends.

The interrupt signal generation circuit shown in FIG. 3(A) may also be used in the back-up circuit 110 to generate a rectangular-pulse signal g with the same predetermined frequency so that the same program shown in FIG. 4 can be used by the period confirmation circuit 150 to check for failure of the main control circuit 100.

Figure 7:
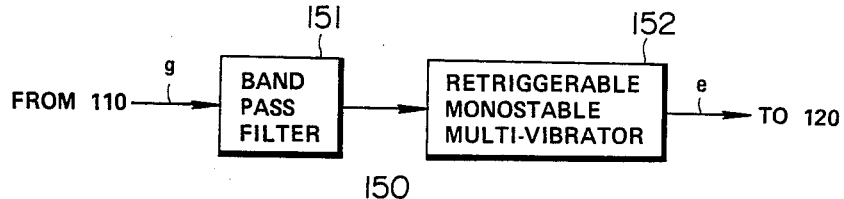
FIG. 7 is a simplified block circuit diagram of a period confirmation circuit shown in FIG. 2.

FIG. 7 shows an example of the period confirmation circuit 150.

As shown in FIG. 7, a band-pass filter 151 and retriggerable monostable multivibrator 152 are connected in series. The switching signal g from the back-up circuit 110 is sent to the retriggerable monostable multivibrator 152 via the band-pass filter 151. The output of the multivibrator 152 functions as the switching signal e. The retriggerable monostable multivibrator 152 is triggered whenever a pulse is received and outputs a signal with a constant signal level as long as the input pulse has a shorter period than the predetermined period of the multivibrator. The retriggerable monostable multivibrator 152 described above is available on the market as, e.g., TTL IC 74122 74LS122 (manufactured by Texas Instrument). Hence, the switching signal e is outputted only when a signal within a given range of the predetermined frequency is received by the period confirmation circuit 150.

In the fail-safe circuit described above, there is little probability of a switching signal e being produced to switch the switching circuit 120 to the back-up signal c due to failure of the back-up circuit 110. This is because even if the back-up circuit 110 should erroneously output a signal g, the period confirmation circuit 150 would not output the signal e unless the input signal g, by rare accident, happened to be a periodic signal in the bandwidth of filter 151.

FIG. 8 shows a second preferred embodiment of the fail-safe circuit according to the present invention. The fail-safe circuit shown in FIG. 8 copes with such failures as breakage of the signal line of the signal e. If the switching circuit 120 is so constructed that the control signal b from the main control circuit 100 is selected as the control output d when the switching signal e is inactive or at its lower level, a pull-down resistor 160 can be connected between the signal line of the switching signal e and ground. On the other hand, if the control signal b from the main control circuit 100 is selected as the control output when the switching signal e is active or high, a pull-up resistor 170 can be connected between a positive power supply and the signal line of the switching signal e. In either case, it is preferable to install such a resistor in the vicinity of the switching circuit 120.

In the circuit described above, even if the period confirmation circuit 150 or the conductor for the switching signal e should fail, the switching circuit 120 will select the control signal b as the control output d to continue normal control by the main control circuit 100.

FIG. 9 shows a third preferred embodiment of the fail-safe circuit according to the present invention.

The back-up circuit 110 in this embodiment outputs the back-up signal c and a plurality of switch pattern signals SP1, SP2, ..., SPN upon determining that the main control circuit 100 is malfunctioning. The main control circuit 100, the switching circuit 120, and the reset circuit 130 are all built in the same way as described in the first preferred embodiment.

As shown in FIG. 9, a logic circuit 140 is connected between the back-up circuit 110 and switching circuit 120 for generating the switching signal e to the switching circuit 120 only when the plurality of switching signals SP1 through SPN are received in a predetermined logical combination.

It should be noted that the status signal a in this embodiment is generated in the same way as in the first preferred embodiment with reference to FIG. 3(A).

Figure 10:
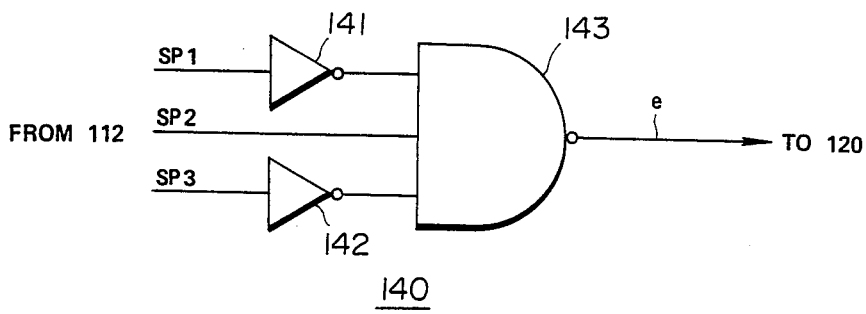
FIG. 10 is a simplified block circuit diagram of a logic circuit shown in FIG. 9.

FIG. 10 shows an example of the internal structure of the logic circuit 140 shown in FIG. 9.

In the example in FIG. 10, there are three signal lines for the switching signals and the back-up signal c is selected as the control output d when the output level, i.e., switching signal e of the logic circuit 140 is low.

The logic circuit 140 comprises first and second inverters 141, 142 provided on the lines denoted SP1 and SP3 and a NAND gate circuit 143 having three input terminals, two of which are connected to the inverters 141, 142.

It will be appreciated that the output level of the NAND gate circuit 143 is low only when the three input terminals thereof are simultaneously at high levels. That is to say, the predetermined logical signal combination is low for the first signal line SP1, high for the second signal line SP2, and low for the third signal line SP3, producing the low-level switching signal e.

Figure 11:
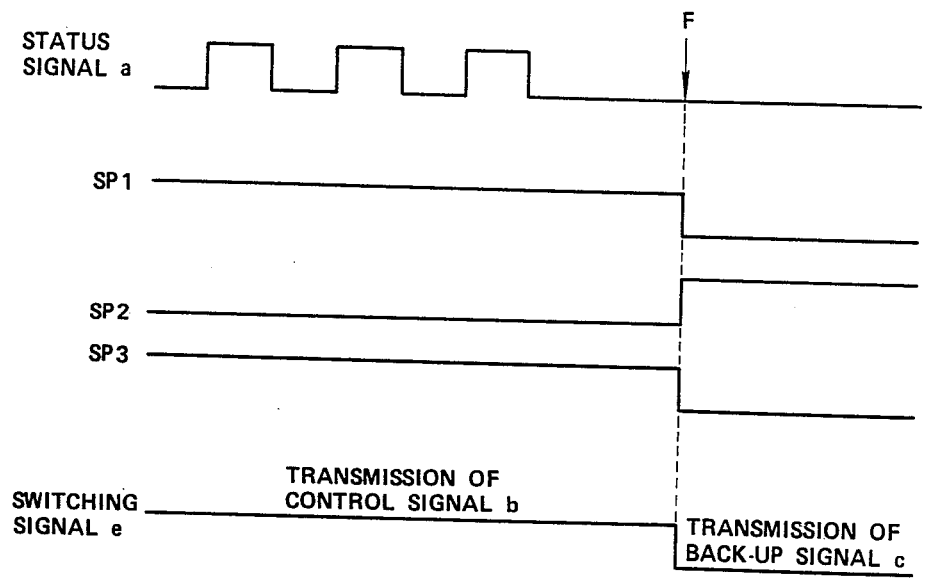
FIG. 11 is a timing chart for the third preferred embodiment shown in FIG. 9.

FIG. 11 is a timing chart for the charts shown in FIG. 9. In FIG. 11, system malfunction is recognized at time F after a predetermined period following the final change of state of the status signal a upon failure of the main control signal 100. At the time F, the back-up circuit 110 produces the signals SP1, SP2, SP3 in the pattern low (inactive) for the first signal ine SP1, high (active) for the second signal line SP2, and low (inactve) for the third signal line SP3. Since the logic circuit 140 deactivates the switching signal e in response to the predeterminede pattern of the three signals SP1, SP2, SP3, the back-up signal c is selected as the control output in place of the control signal b.

In the fail-safe circuit described above, there is little probability of a low-level switching signal e being generated due to the failure in the back-up circuit 110. This is because the switching circuit 120 will select the back-up signal c in place of the control output d only when the switching pattern signals SP1, SP2, SP3 fall in the given pattern-low (inactive) for the first signal line SP1, high (actve) for the second signal line (active), and low for the third signal line (inactive).

The fail-safe circuit in this embodiment provides remarkably less probability of erroneous fail-safing even if the back-up circuit 110 itself fails while the main control circuit 100 continues to operate normally since there is less probability that the above-described plurality of pattern signals will appear in the particular pattern (, i.e., low, high, and low).

Figure 12:
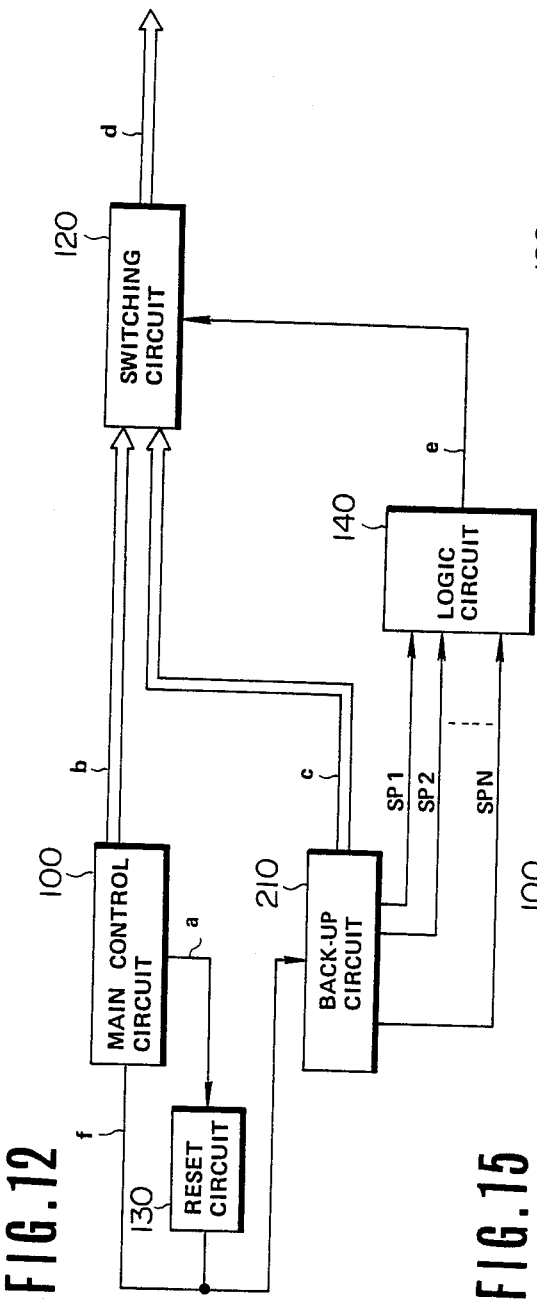
FIG. 12 is a simplified block circuit diagram of a fourth preferred embodiment according to the present invention.

FIG. 12 shows a fourth preferred embodiment of the fail-safe circuit according to the present invention.

In this embodiment, failure of the main control circuit 100 is recognized by way of the output of the reset circuitry. It should be noted that since the individual circuits shown in FIG. 12 are built in the same manner as in the third preferred embodiment, detailed description thereof will not be repeated.

As shown in FIG. 12, the signal a is not sent to the back-up circuit 210 but is sent only to the reset circuit 130. The back-up circuit 210 receives instead the reset signal f from the reset circuit. In other words, the back-up circuit 210 recognizes failure of the main control circuit 100 by counting the number of times the reset circuit 130 outputs the reset signal f when the main control circuit 100 malfunctions.

Figure 13A:
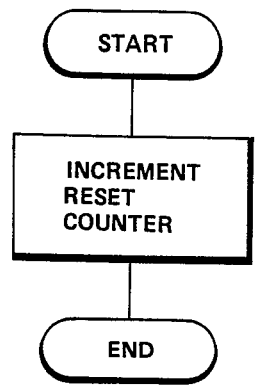
FIG. 13(A) and FIG. 13(B) are processing flowcharts for the process of generating the switching signal in the back-up circuit shown in FIG. 12.
Figure 13B:
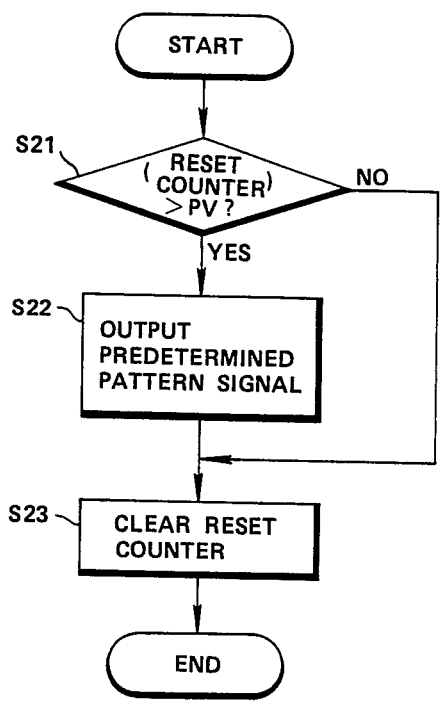

FIGS. 13(A) and 13(B) cooperate to form a method of recognizing failure on the main control circuit executed by the back-up circuit 210.

FIG. 13(A) increments a reset counter to count the number of reset operations in response to receipt of each reset signal. The reset counter can be realized either in software or hardware. FIG. 13(B), on the other hand, is to be executed at a predetermined frequency.

In detail, in a step S21, the back-up circuit 210 refers to the reset counter and determines whether the counted value exceeds a predetermined value PV. If the answer is Yes ((counter)>PV) in the step S21, i.e., the back-up circuit 210 recognizes that the main control circuit 100 is malfunctioning and the routine goes to a step S22, wherein the back-up circuit 100 outputs the predetermined signal pattern on the signal lines SP1, SP2, ... SPN. If the answer is No ((counter)≦PV) in the step S21 or after execution of the step S22, the routine goes to a step S23 wherein the reset counter is cleared and the program shown in FIG. 13(B) ends.

Figure 14:
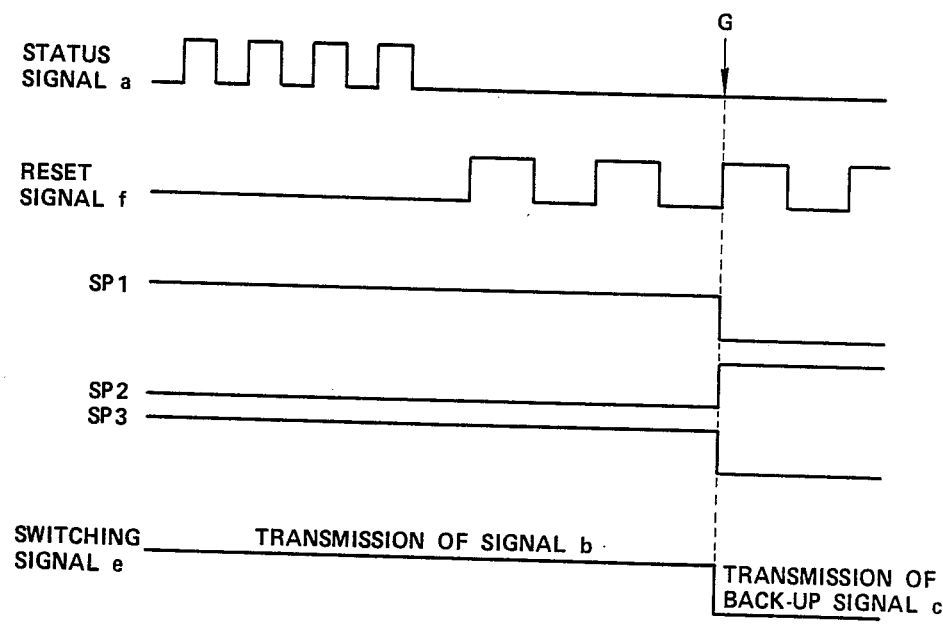
FIG. 14 is a timing chart for the circuit shown in FIG. 12.

FIG. 14 is a timing chart for typical circuits shown in FIG. 12.

In FIG. 14, failure of the main control circuit is recognized at time G after a given number of reset signals f have been generated due to the absence of the status signal a. At the time G, the back-up circuit 210 renders the three signal lines SP1, SP2, and SP3 inactive (the level of the first signal line is low), active (the level of the second signal line is high), and inactive (the level of the third signal line is low), respectively.

Therefore, the logic circuit 140 deactivates the switching signal e so that the control output d is switched to the back-up signal c. In this way, the same effect as in the third preferred embodiment can be achieved.

Figure 15:
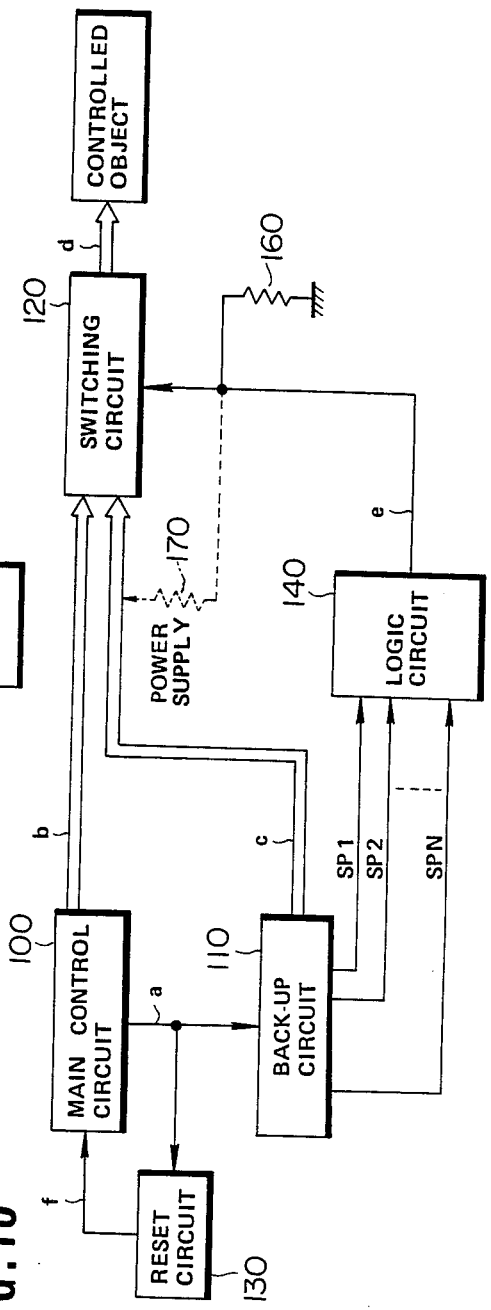
FIG. 15 is a simplified block circuit diagram of a fifth preferred embodiment according to the present invention.

FIG. 15 shows a fifth preferred embodiment of the fail-safe circuit according to the present invention.

The fail-safe circuit shown in FIG. 15 is designed to cope with such problems as breakage in the line of the switching signal e.

If the switching circuit 120 is designed to select the control signal b from the main control circuit 100 as the control output d when the switching signal e is deactivated, a pull-down resistor 160 is connected between the signal line of the switching signal e and ground in the same way as in the second preferred embodiment of FIG. 8.

On the other hand, if the switching circuit 120 is designed to select the control signal b from the main control circuit 100 as the control output d when the switching signal e is activated, the pull-up resistor 170 is connected between the signal line of the switching signal e and a positive power supply. In either case, it is preferable to dispose this resistor in the vicinity of the switching circuit 120.

Since the control signal b will be selected as the control output d even in cases of breakage in the logic circuit 140 and/or in the signal ine of the switching signal e, the normal operation of the main control circuit 100 will not be disturbed due to failure of the fail-safe circuit.

The present invention can be applied to various kinds of control systems. Among such applications, the present invention can be applied equally well to systems wherein the main control circuit and the back-up circuit perform the same functions and to systems wherein the back-up circuit, when replacing the main control circuit, fulfills the minimum requirements of the controlled object.

For example, in cases where the present invention is applied to a control system for an automotive vehicle, the main control circuit may control ignition and fuel injection timing, etc. according to engine operating conditions and the back-up circuit may generate data representing fixed injection duration and ignition timing values, etc. whenthe main control circuit fails. Although in each embodiment, only a single-stage fail-safe circuit including the back-up circuit is shown, it would be very easy to install any desired number of stages according to need.

In addition, although in the first and second preferred embodiments only one period confirmation circuit is provided, it would be very easy to install a plurality of such period confirmation circuits so that a combination of these outputs could trigger the switching operation in the switching circuit. Consequently, the reliability of the control system can be remarkably enhanced.

Furthermore, although the period confirmation circuit in FIG. 7 comprises a band-pass filter, a high-pass filter may be used in place of the band-pass filter if the back-up circuit most commonly fails in such a manner that the period of the switching signal is increased or if output of the switching signal stops altogether.

As described hereinabove, since in the fail-safe circuit for the control system according to the present invention, the switching circuit selects the back-up signal c as the control output d only when the back-up circuit outputs a particular signal, the danger of outputting an abnormal signal as the control output due to erroneous selection of the malfunctioning back-up signal as the control output when the back-up circuit fails while the main control circuit is operating normally can be avoided. Consequently, the control system reliability can be remarkably increased.

It will be clearly be appreciated by those skilled in the art that the foregoing description has been in terms of preferred embodiments and that various modifications may be made without departing from the scope of the present invention, which is to be defined by the appended claims.

What is claimed is:

1. A fail-safe circuit for a control system, comprising:
   (a) a main control circuit which produces and sends a first control signal to a controlled device for controlling the controlled device;
   (b) a back-up control circuit which operatively produces and sends a second control signal to the controlled device in place of the first control signal when the main control circuit fails, the back-up control circuit having first means for recognizing a malfunction of said main control circuit and proper operation of the back-up control circuit and second means for generating a unique switching signal when said first means recognizes the malfunction of said main control circuit and proper operation of the back-up control circuit;
   (c) a switching circuit for switching between the first and second control signals to transmit either of the first and second control signals to the controlled device depending on a presence or absence of the unique signal generated from said second means; and
   (d) a switching control circuit for controlling the switching circuit to enable transmission of the second control signal produced from the back-up control circuit to the controlled device when the unique switching signal is received from the back-up control circuit and for enabling transmission of the first control signal produced from the main control circuit when the unique switching signal is not received from the back-up control circuit, thereby preventing an erroneous switching of the switching circuit when the main control circuit is operating properly and the back-up control circuit generates a faulty switching signal.

2. The fail-safe circuit according to claim 1, wherein the unique switching signal from said back-up control circuit is a signal having a predetermined frequency and is outputted to the switching control circuit when the first means recognizes the malfunction of the main control circuit and proper operation of the back-up control circuit and wherein the switching control circuit enables the switching circuit to transmit the second control signal to the controlled device when the unique signal derived from the second means is received, wherein the unique signal falls within a given range including the predetermined frequency.

3. The fail-safe circuit according to claim 2, wherein said switching control circuit comprises: a band-pass filter which receives the unique signal from said second means and transmits the components of the unique switching signal falling within a predetermined frequency band; and a retriggerable monostable multivibrator connected to said band-pass filter which outputs a third control signal when components of said unique signal fall within a given range of the predetermined frequency.

4. The fail-safe circuit according to claim 1, wherein the unique switching signal derived from said second means of the back-up control circuit comprises a plurality of parallel logical signals in a predetermined combination of logical levels and said switching control circuit enables the switching circuit to transmit the second control signal to the controlled device only when the unique signal has the predetermined combination of logic levels.

5. The fail-safe circuit according to claim 4, further including means for resetting said main control circuit whenever said main control circuit malfunctions, wherein said first means of the back-up control circuit recognizes malfunction of said main control circuit on the basis of the number of times said main control circuit is reset.

6. The fail-safe circuit according to claim 4, wherein said switching circuit transmits the first control signal from said main control circuit to the controlled device in the absence of a third control signal derived from said switching control circuit which is produced when the unique signal is received.

7. The fail-safe circuit according to claim 1, wherein said first means recognizes malfunction of said main control circuit on the basis of a period of a status signal generated periodically during the process of generating the first control signal by said main control circuit.

8. The fail-safe circuit according to claim 7, wherein said main control circuit comprises: a control section having a microprocessor; a register for receiving and storing temporarily a predetermined value from said control section during execution of a series of control procedures by said control section; a timer for counting fixed-frequency clock pulses; a comparator for comparing the predetermined value stored in said register with the number of clock pulses counted by said timer and outputting an interrupt signal to said timer for resetting said timer and to said control section for changing the level of said status signal, whereby the status signal has a predetermined period when said main control circuit is operating normally.

9. The fail-safe circuit according to claim 8, wherein said back-up control circuit comprises: a control section having the same structure as said main control circuit; a timer for counting clock pulses; and a capture register which temporarily stores the counted value of said timer in response to the rising edge of said status signal from said main control circuit, said control section of said back-up control circuit reading and comparing the values of said capture register at successive rising edges of said status signal so as to obtain the period of said status signal.

10. The fail-safe circuit according to claim 9, wherein said control section constitutes said first of said back-up control circuit means and said first means recognizes malfunction of said main control circuit when the period of said status signal is not substantially equal to a predetermined period and the interval of time over which the period of the status signal is not substantially equal to the predetermined period exceeds a predetermined interval of time.

11. The fail-safe circuit according to claim 10, wherein said second means outputs a plurality of parallel logical signals in a predetermined combination of logic levels when said first means recognizes malfunction of said main control circuit and said switching control circuit outputs the third control signal to said switching circuit only in response to the predetermined combination of logical levels.

12. The fail-safe circuit according to claim 11, wherein said switching control circuit comprises a logic circuit having a plurality of input terminals, each receiving a corresponding one of the plurality of parallel logical signals from said second means, and one output terminal from which the third control signal is outputted to said switching circuit only when the combination of logic levels of the parallel logical signals satisfied a predetermined logical condition.

13. The fail-safe circuit according to claim 12, wherein the second means outputs three parallel signals at low, high and low logic levels respectively, and said logic circuit comprises two inverters receiving the two low-level signals and a NAND gate circuit receiving the two inverted signals and the remaining high-level signal, whereby the NAND gate circuit outputs the third control signal at a low logic level to said switching control circuit to enable said switching control circuit to transmit the second control signal to the controlled device.

14. The fail-safe circuit according to claim 14, wherein said switching circuit transmits the first control signal when a third control signal, derived from the switching control circuit produced when the unique signal is received, is at a grounded voltage level and further comprising a pull-down resistor connected between a line connecting said switching circuit and switching control circuit and ground.

15. The fail-safe circuit according to claim 15, wherein said switching control circuit transmits the first control signal when the third control signal is at a higher of two voltage levels and further comprising a pull-up resistor connected between a line connecting said switching circuit and switching control circuit and a positive power supply.

16. The fail-safe circuit according to claim 16, wherein the second control signal satisfies minimum requirements of control of the controlled device.

* * * * *